United States Patent
Sun et al.

(10) Patent No.: US 10,001,677 B2
(45) Date of Patent: Jun. 19, 2018

(54) SELF-CAPACITANCE TOUCH DISPLAY PANEL AND DISPLAY APPARATUS

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Yungang Sun, Shanghai (CN); Chunmei He, Shanghai (CN); Gujun Li, Shanghai (CN); Kang Yang, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 82 days.

(21) Appl. No.: 15/081,343

(22) Filed: Mar. 25, 2016

(65) Prior Publication Data

US 2016/0291424 A1 Oct. 6, 2016

(30) Foreign Application Priority Data

Apr. 1, 2015 (CN) .......................... 2015 1 0152833

(51) Int. Cl.
*G06F 3/044* (2006.01)
*G02F 1/1343* (2006.01)
(Continued)

(52) U.S. Cl.
CPC .... *G02F 1/134309* (2013.01); *G02F 1/13338* (2013.01); *G06F 3/044* (2013.01); *G06F 3/0412* (2013.01)

(58) Field of Classification Search
CPC ........... G06F 3/044; G06F 2203/04104; G06F 2203/04111; G06F 3/0416; G02F 1/13338;
(Continued)

(56) References Cited

U.S. PATENT DOCUMENTS 9,189,117 B2 11/2015 Mo et al.
2008/0180584 A1 7/2008 Utsunomiya et al.
(Continued)

FOREIGN PATENT DOCUMENTS

CN 101236319 A 8/2008
CN 103293778 A 9/2013
(Continued)

OTHER PUBLICATIONS

Chinese Application No. 201510152833.4, Second Office Action dated Sep. 13, 2017.
(Continued)

*Primary Examiner* — Huyen Ngo
(74) *Attorney, Agent, or Firm* — Alston & Bird LLP

(57) ABSTRACT

A touch display panel and a display apparatus are provided. The touch display panel includes: a first substrate, a second substrate, a common electrode layer, a touch electrode layer and a touch electrode wire layer. The common electrode layer is an entire piece of electrode; thus, respective display units may be ensured to have the same common voltage during a display driving, thereby solving the conventional problem of image flicker and non-uniform display of the display panel due to different common voltages in the respective display units caused by different resistances of the block-shaped electrodes in the common electrode layer. Moreover, the touch electrodes in the touch electrode layer are metal grid electrodes. Hence, the resistances of the touch electrodes are reduced and a touch sensitivity of the touch (Continued)

display panel is improved, while a high light transmittance of the touch display panel is ensured.

20 Claims, 9 Drawing Sheets

(51) Int. Cl.
*G06F 3/041* (2006.01)
*G02F 1/1333* (2006.01)

(58) Field of Classification Search
CPC ......... G02F 1/134336; G02F 1/133512; G02F 2201/121; G02F 1/134309
See application file for complete search history.

(56) References Cited

U.S. PATENT DOCUMENTS

| | | | |
|---|---|---|---|
| 2014/0118642 A1* | 5/2014 | Wang | G02F 1/13338 349/12 |
| 2015/0002421 A1 | 1/2015 | Kim et al. | |
| 2015/0035791 A1* | 2/2015 | Mo | G09G 3/3648 345/174 |
| 2016/0103547 A1* | 4/2016 | Lu | G06F 3/0416 345/174 |
| 2016/0357308 A1 | 12/2016 | Li et al. | |
| 2017/0185225 A1* | 6/2017 | Ding | G06F 3/044 |
| 2017/0192607 A1* | 7/2017 | Chai | G02F 1/133345 |

FOREIGN PATENT DOCUMENTS

| | | |
|---|---|---|
| CN | 103425347 A | 12/2013 |
| CN | 103995616 A | 8/2014 |
| CN | 104461209 A | 3/2015 |

OTHER PUBLICATIONS

Chinese Application 201510152833.4, First Office Action dated Jan. 26, 2017.

* cited by examiner

SELF-CAPACITANCE TOUCH DISPLAY PANEL AND DISPLAY APPARATUS

CROSS REFERENCE TO RELATED APPLICATIONS

The present application claims the priority to Chinese Patent Application No. 201510152833.4, entitled "TOUCH DISPLAY PANEL AND DISPLAY APPARATUS", filed on Apr. 1, 2015 with the State Intellectual Property Office of the PRC, the contents of which are hereby incorporated by reference in their entirety.

BACKGROUND

With the development of display technology, many display panels may incorporate touch functions based on a mutual capacitance touch technology or a self capacitance touch technology. In comparison to mutual capacitance touch technology, the self capacitance touch technology may be more applicable to a light and thin display panels since only one touch electrode layer may be needed for the self capacitance touch technology.

Currently, in a self capacitance touch display panel, a common electrode in the display panel may be divided into multiple block-shaped electrodes and is driven in a time-division manner, and the common electrode further serves as touch electrodes, which may reduce the display panel thickness, improve production efficiency and lower production cost. However, resistances of different block-shaped electrodes may be uniform. Therefore, during a driving process, voltages of different block-shaped electrodes may be different, and voltage differences across liquid crystal molecules in respective display units may be different, which, in turn, may result in image flicker and non-uniform display. Such effects may negatively affect and/or degrade the user experience.

BRIEF SUMMARY

A touch display panel and a display apparatus including the touch display panel are provided according to embodiments of the present disclosure, to solve the problems of image flicker and non-uniform display of the conventional self-capacitance touch display panel.

To solve the above problems, the following technical solutions are provided according to the embodiments of the present disclosure.

A touch display panel is provided, which may include: a first substrate and a second substrate disposed opposite to each other, where the second substrate is above the first substrate; a common electrode layer disposed between the first substrate and the second substrate, where the common electrode layer is an entire piece of electrode; a touch electrode layer disposed above the common electrode layer, where the touch electrode layer comprises multiple touch electrodes and the touch electrodes are metal grid electrodes; and a touch electrode wire layer disposed above the common electrode layer, where the touch electrode wire layer comprises multiple touch electrode wires, an one-to-one correspondence exists between the touch electrode wires and the touch electrodes, and the touch electrode wires are electrically connected to the touch electrodes respectively.

A display apparatus including any one of the above-mentioned touch display panel is provided.

In the technical solution according to the embodiments of the present disclosure, the common electrode layer is disposed in a different layer from the touch electrode layer, and the common electrode layer is an entire piece of electrode. Thus, respective display units may be ensured to have the same common voltage during a display driving, thereby solving the conventional problem of image flicker and non-uniform display of the display panel due to different common voltages in the respective display units caused by different resistances of the block-shaped electrodes in the common electrode layer.

Moreover, in the embodiments of the present disclosure, the touch electrodes in the touch electrode layer are metal grid electrodes. Hence, the resistances of the touch electrodes are reduced and a touch sensitivity of the touch display panel is improved, while a high light transmittance of the touch display panel is ensured.

BRIEF DESCRIPTION OF THE DRAWINGS

The drawings to be used in the description of embodiments or the conventional technology are described briefly as follows, so that technical solutions according to the embodiments of the present disclosure or according to the conventional technology may become clearer. It is obvious that the drawings in the following description only illustrate some embodiments of the present disclosure. For those skilled in the art, other drawings may be obtained based on these drawings without any creative work.

DETAILED DESCRIPTION OF VARIOUS EMBODIMENTS

In the conventional touch display panel described in the background, resistances of different block-shaped electrodes are not all the same; accordingly, during a driving process, voltages of different block-shaped electrodes are different, and voltage differences across liquid crystal molecules in respective display units are different, which may result in image flicker and non-uniform display. In view of the above disadvantages, following technical solutions are given in the present disclosure.

The technical solutions according to embodiments of the present disclosure are described clearly and completely hereinafter in conjunction with the drawings. It is obvious that the described embodiments are only a part rather than all of the embodiments according to the present disclosure. Any other embodiments obtained by those skilled in the art based on the embodiments in the present disclosure without any creative work fall in the scope of the present disclosure.

Many specific details are set forth in the following descriptions for sufficient understanding of the disclosure. The disclosure can also be implemented in other ways different from the way described herein, similar extensions can be made by those skilled in the art without departing from the spirit of the disclosure; therefore, the disclosure is not limited to particular embodiments disclosed hereinafter.

Figure 1:
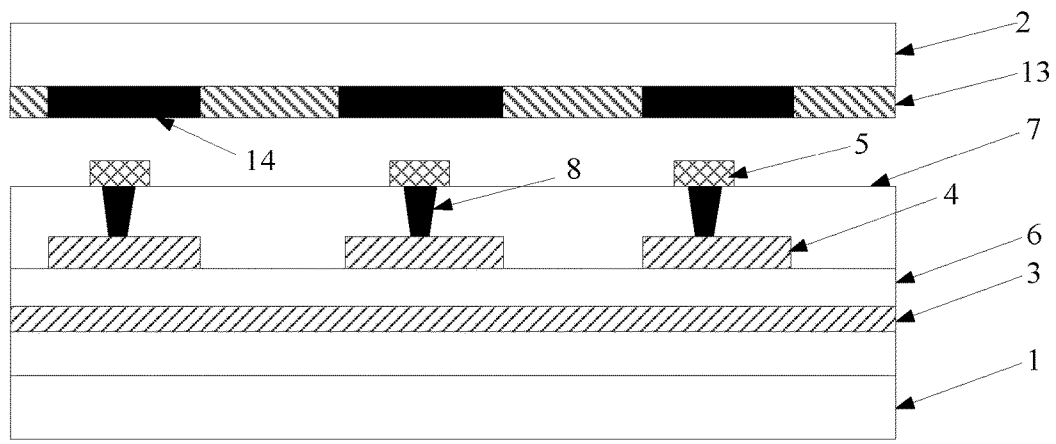
FIG. 1 is a schematic structural diagram of a touch display panel according to an embodiment of the present disclosure.

As shown in FIG. 1, a touch display panel is provided according to an embodiment of the present disclosure.

The touch display panel includes: a first substrate 1 and a second substrate 2 disposed opposite to each other, where the second substrate 2 is above the first substrate 1; a common electrode layer 3 disposed between the first substrate 1 and the second substrate 2, where the common electrode layer 3 is a whole piece of electrode; a touch electrode layer 4 disposed above the common electrode layer 3, where the touch electrode layer includes multiple touch electrodes and the touch electrodes are metal grid electrodes; and a touch electrode wire layer 5 disposed above the common electrode layer 3, where the touch electrode wire layer includes multiple touch electrode wires, an one-to-one correspondence exists between the touch electrode wires and the touch electrodes, and the touch electrode wires are respectively electrically connected to the touch electrodes.

It should be noted that, in the embodiment of the present disclosure, a first insulation layer 6 is disposed between the common electrode layer 3 and the touch electrode layer 4, to insulate the common electrode layer 3 from the touch electrode layer 4.

Figure 2:
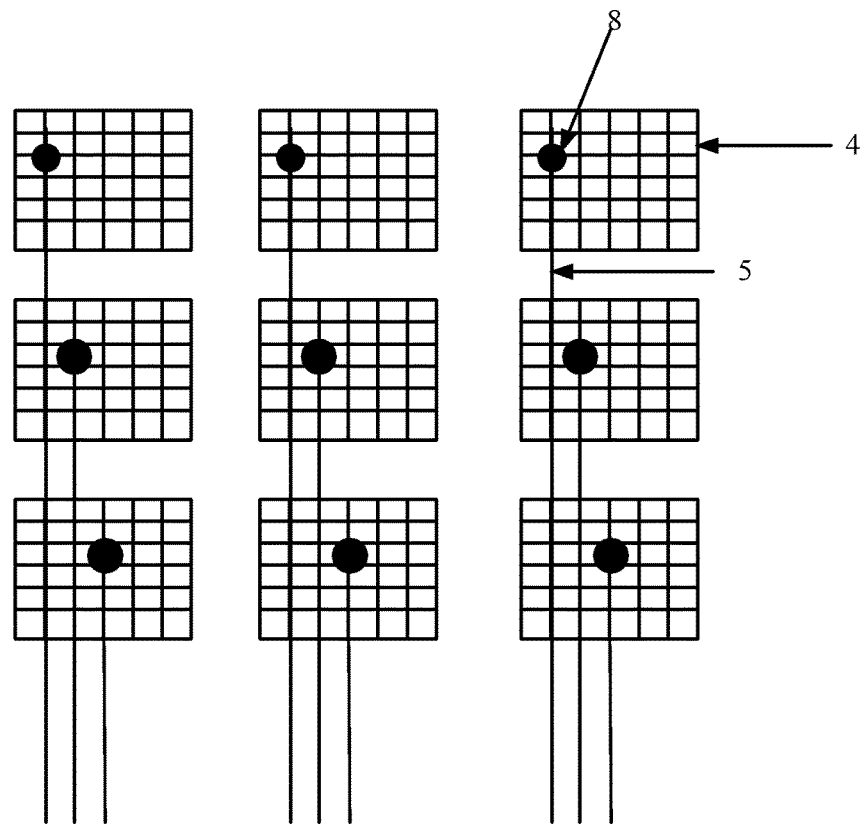
FIG. 2 is a top view of a touch electrode layer and a touch electrode wire layer in a touch display panel according to an embodiment of the present disclosure.

Based on the above embodiment, in an embodiment of the present disclosure, the touch electrode layer 4 is disposed in a different layer from the touch electrode wire layer 5. As shown in FIGS. 1 and 2, in the embodiment, a second insulation layer 7 is disposed between the touch electrode layer 4 and the touch electrode wire layer 5, via holes 8 are provided in the second insulation layer 7, and the touch electrode layer 4 is electrically connected to the touch electrode wire layer 5 through the via holes 8.

Based on the above embodiments, in one embodiment of the present disclosure, the respective touch electrodes in the touch electrode layer 4 have the same area and the same shape, as shown in FIG. 2. The present disclosure is not limited in this aspect, and in other embodiments of the present disclosure, the touch electrodes in the touch electrode layer 4 may have the same shape and different areas, or have different areas and different shapes, which is not limited in the present disclosure and depends on actual cases.

Figure 3:
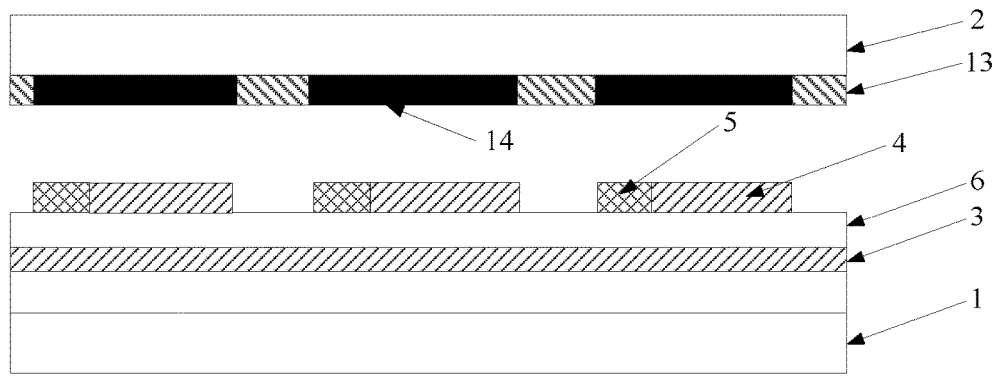
FIG. 3 is a schematic structural diagram of a touch display panel according to an embodiment of the present disclosure.
Figure 4:
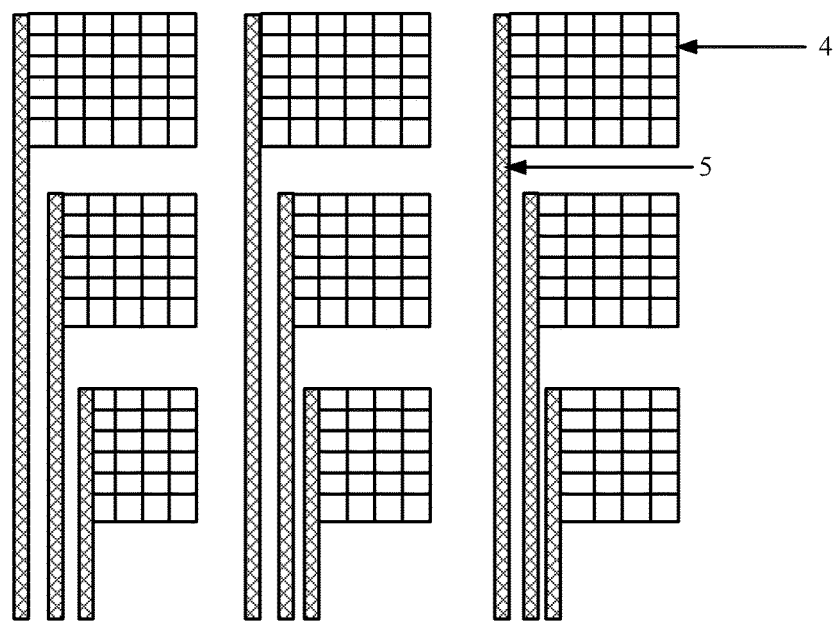
FIG. 4 is a top view of a touch electrode layer and a touch electrode wire layer in a touch display panel according to an embodiment of the present disclosure.

In another embodiment of the present disclosure, as shown in FIG. 3, the touch electrode layer 4 is disposed in the same layer with the touch electrode wire layer 5, to reduce the thickness of the touch display panel. In an example of the present disclosure, as shown in FIG. 4, the areas of the touch electrodes in the touch electrode layer 4 are may be reduced gradually along an extension direction of the touch electrode wire. As shown in FIG. 4, each of the multiple touch electrode wires extends vertically. The present disclosure is not limited in this aspect, and in other embodiments of the present disclosure, the touch electrodes in the touch electrode layer 4 may have the same area, or only a part of the touch electrodes have the same area, which depends on actual cases.

Figure 5:
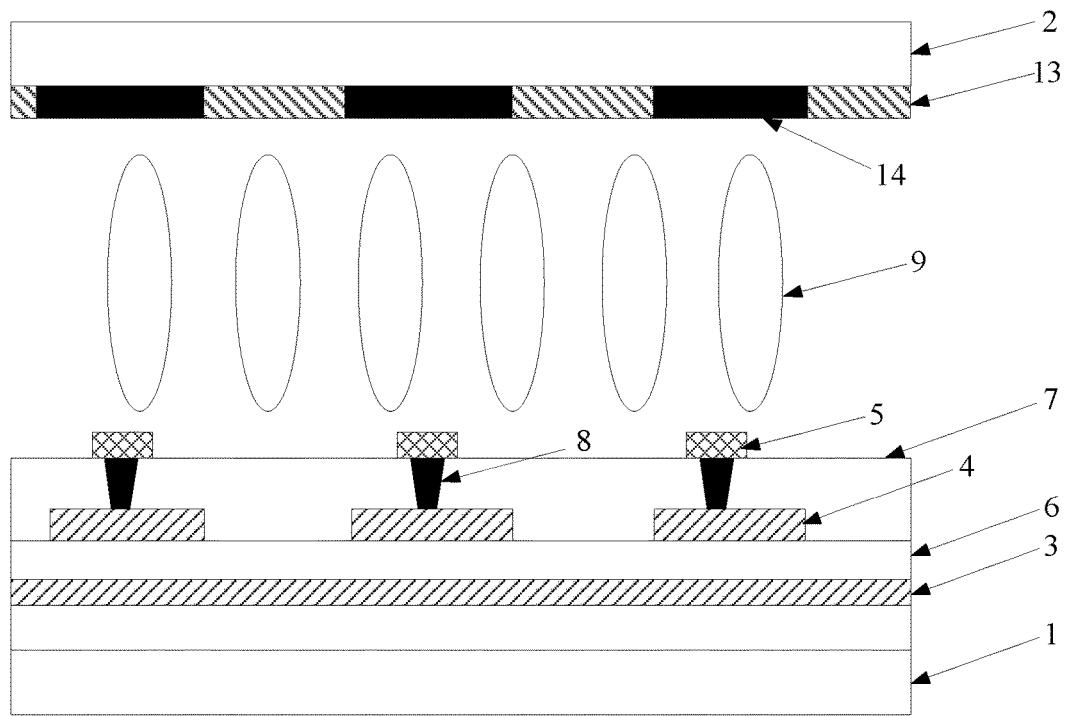
FIG. 5 is a schematic structural diagram of a touch display panel according to an embodiment of the present disclosure.

Based on any one of the above embodiments, in an embodiment of the present disclosure, a liquid crystal layer 9 is disposed between the first substrate 1 and the second substrate 2, and the touch electrode layer 4 and the touch electrode wire layer 5 are disposed between the first substrate 1 and the liquid crystal layer 9, as shown in FIG. 5.

Figure 6:
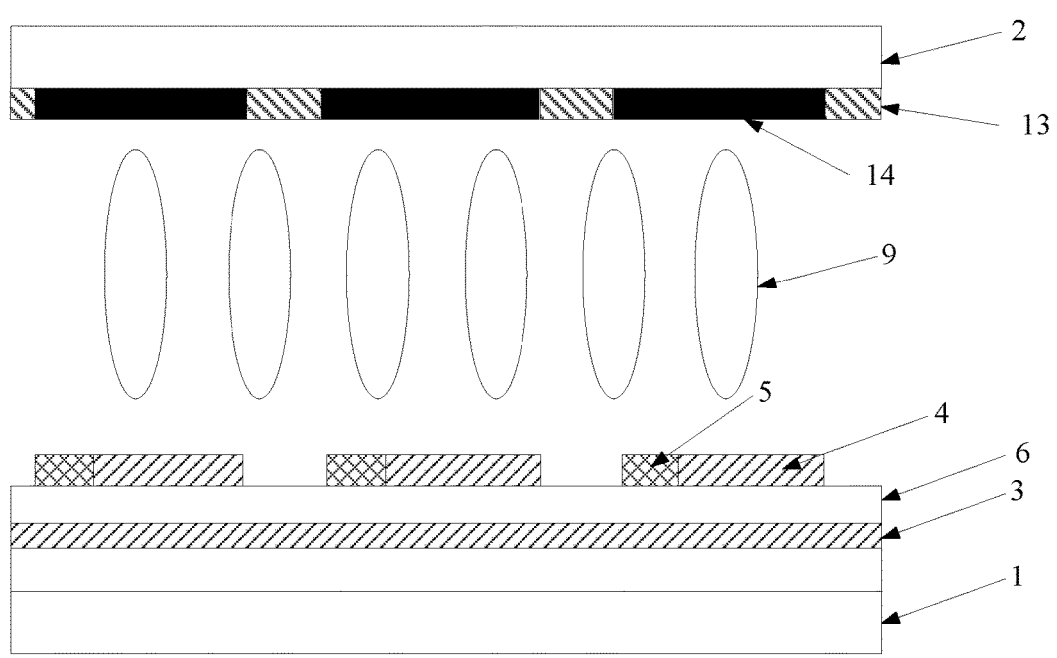
FIG. 6 is a schematic structural diagram of a touch display panel according to an embodiment of the present disclosure.

Based on the above embodiments, in an embodiment of the present disclosure, the touch electrode layer 4 is disposed in a different layer from the touch electrode wire layer 5, and is electrically connected to the touch electrode wire layer 5 through the via holes 8, as shown in FIG. 5. In another embodiment of the present disclosure, the touch electrode layer 4 is disposed in the same layer with the touch electrode wire layer 5 and is electrically connected to the touch electrode wire layer 5 directly, as shown in FIG. 6.

Figure 7:
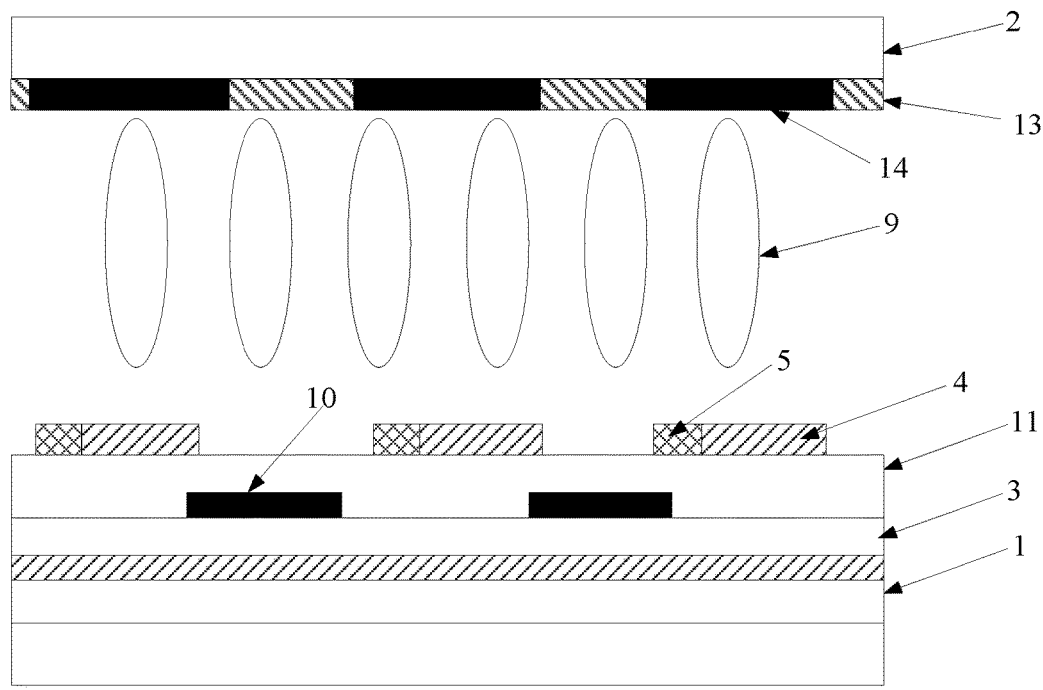
FIG. 7 is a schematic structural diagram of a touch display panel according to an embodiment of the present disclosure.
Figure 8:
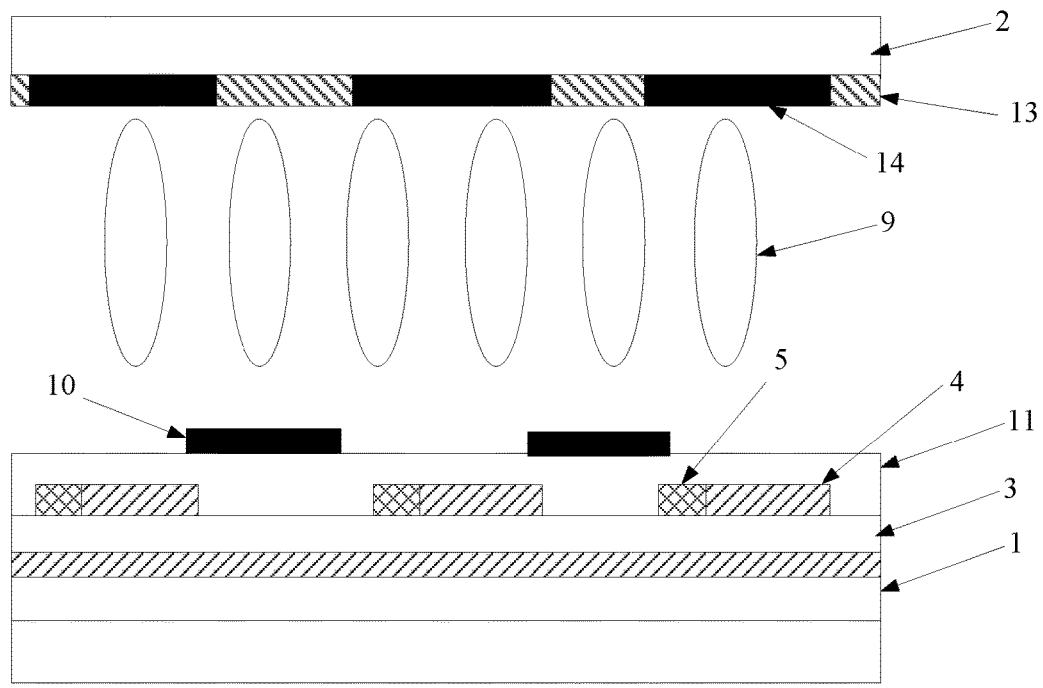
FIG. 8 is a schematic structural diagram of a touch display panel according to an embodiment of the present disclosure.
Figure 9:
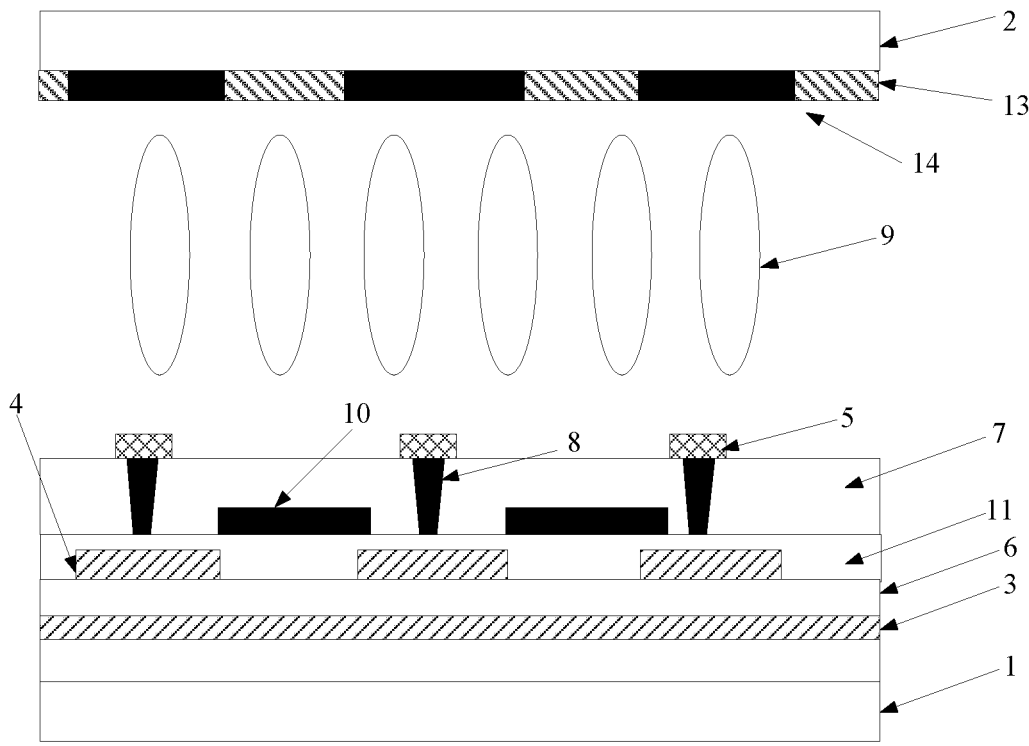
FIG. 9 is a schematic structural diagram of a touch display panel according to an embodiment of the present disclosure.
Figure 10:
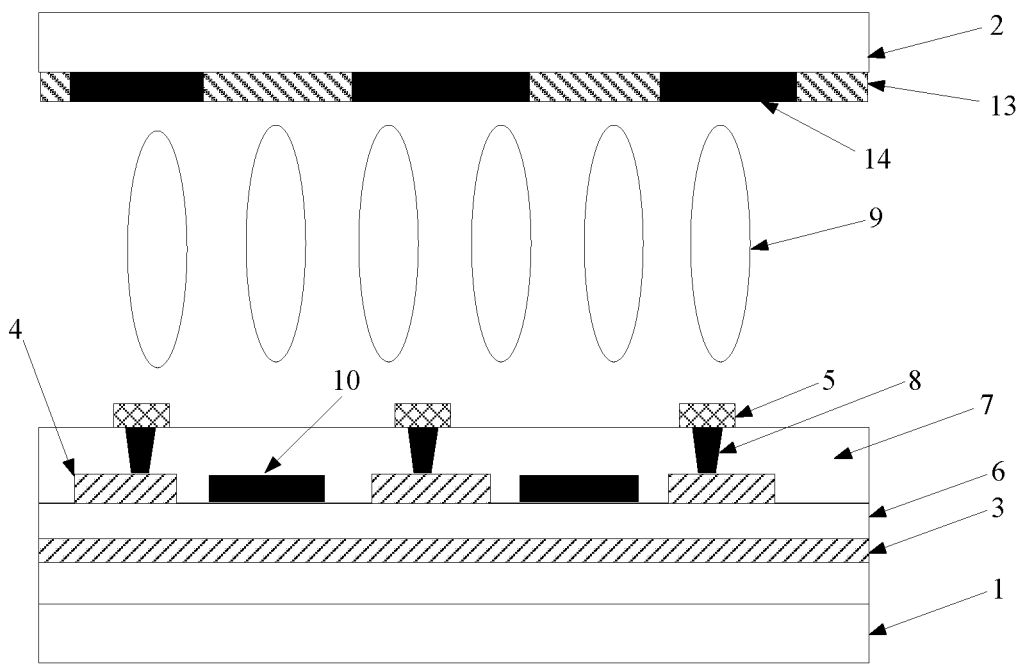
FIG. 10 is a schematic structural diagram of a touch display panel according to an embodiment of the present disclosure.
Figure 11:
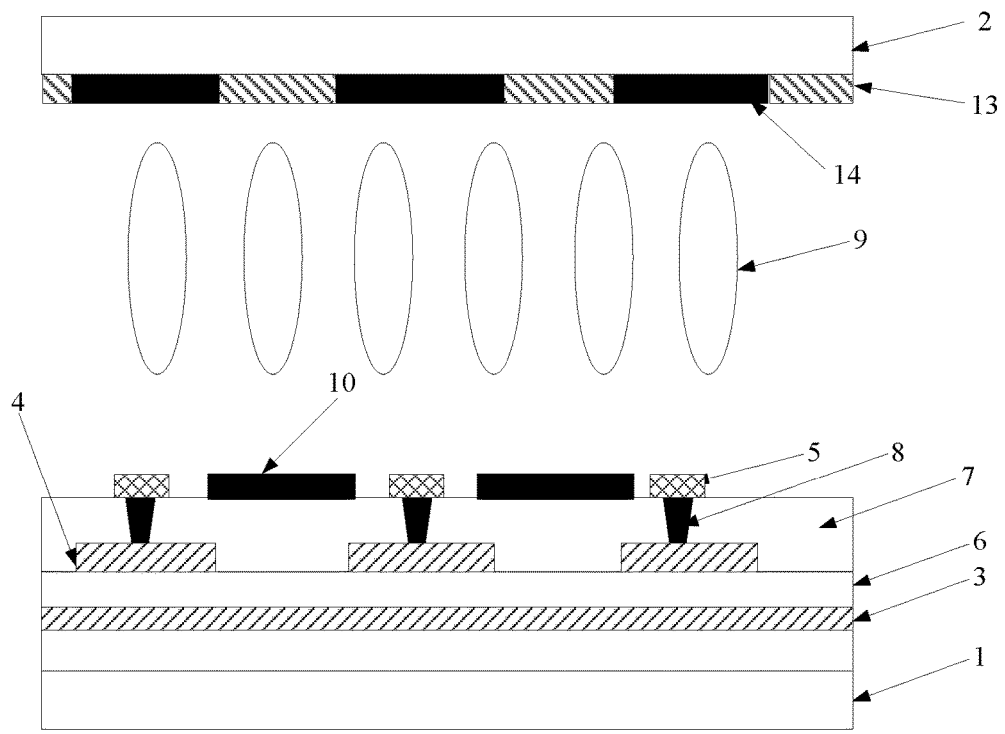
FIG. 11 is a schematic structural diagram of a touch display panel according to an embodiment of the present disclosure.

It should be noted that, in an embodiment, a pixel electrode layer 10 is disposed above the common electrode layer 3, and the pixel electrode layer 10 may be disposed between the touch electrode layer 4 and the common electrode 3, and a third insulation layer 11 is disposed between the touch electrode layer 4 and the pixel electrode layer 10, as shown in FIG. 7. In another embodiment of the present disclosure, the pixel electrode layer 10 may be disposed above the touch electrode wire layer 5, and the third insulation layer 11 is disposed between the pixel electrode layer 10 and the touch electrode wire layer 5, as shown in FIG. 8. In yet another embodiment of the present disclosure, in a case that the touch electrode layer 4 is disposed in a different layer from the touch electrode wire layer 5, the pixel electrode layer 10 may be disposed between the touch electrode layer 4 and the touch electrode wire layer 5, as shown in FIG. 9; or the pixel electrode layer 10 may be disposed in the same layer with the touch electrode layer 4, as shown in FIG. 10; or the pixel electrode layer 10 may be disposed in the same layer with the touch electrode wire layer 5, as shown in FIG. 11, to reduce the thickness of the touch display panel, which is not limited herein and depends on actual cases.

Figure 12:
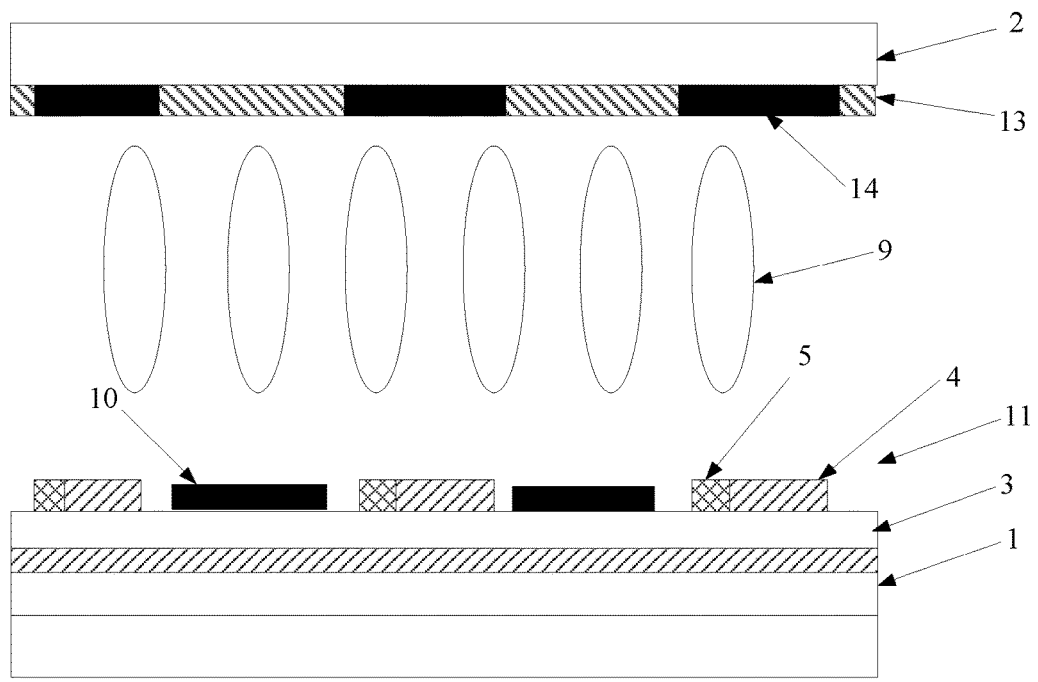
FIG. 12 is a schematic structural diagram of a touch display panel according to an embodiment of the present disclosure.

It should also be noted that, in a case that the touch electrode layer 4 is disposed in the same layer with the touch electrode wire layer 5, the pixel electrode layer 10 may be disposed in the same layer with the touch electrode layer 4, as shown in FIG. 12, to further reduce the thickness of the touch display panel, which is not limited herein and depends on actual cases.

Figure 13:
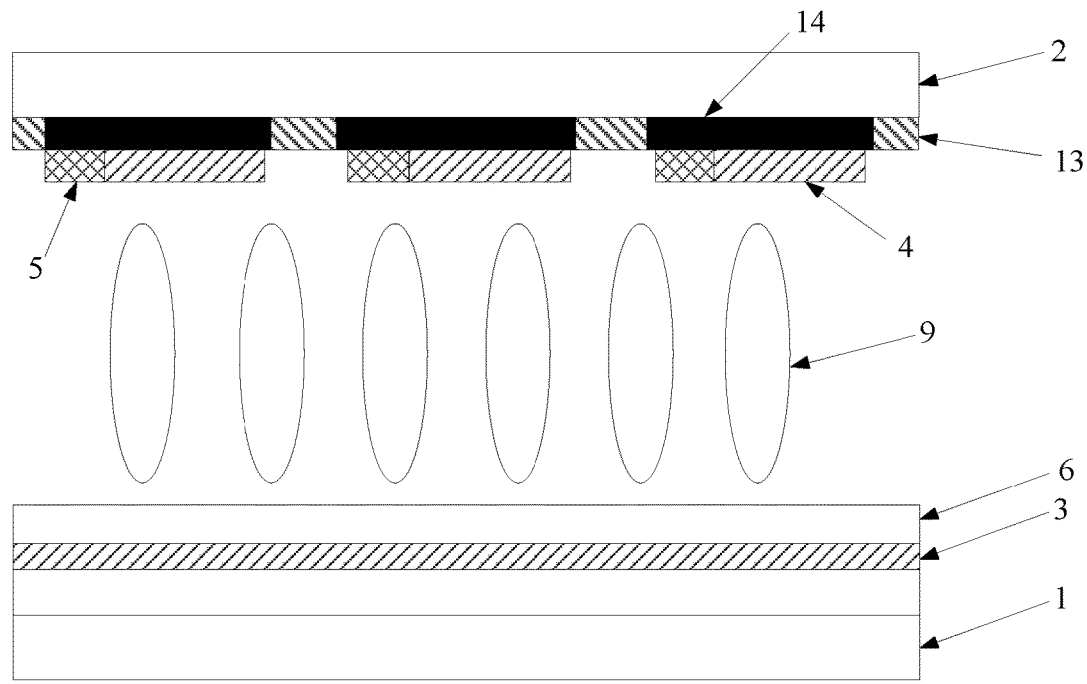
FIG. 13 is a schematic structural diagram of a touch display panel according to an embodiment of the present disclosure
Figure 14:
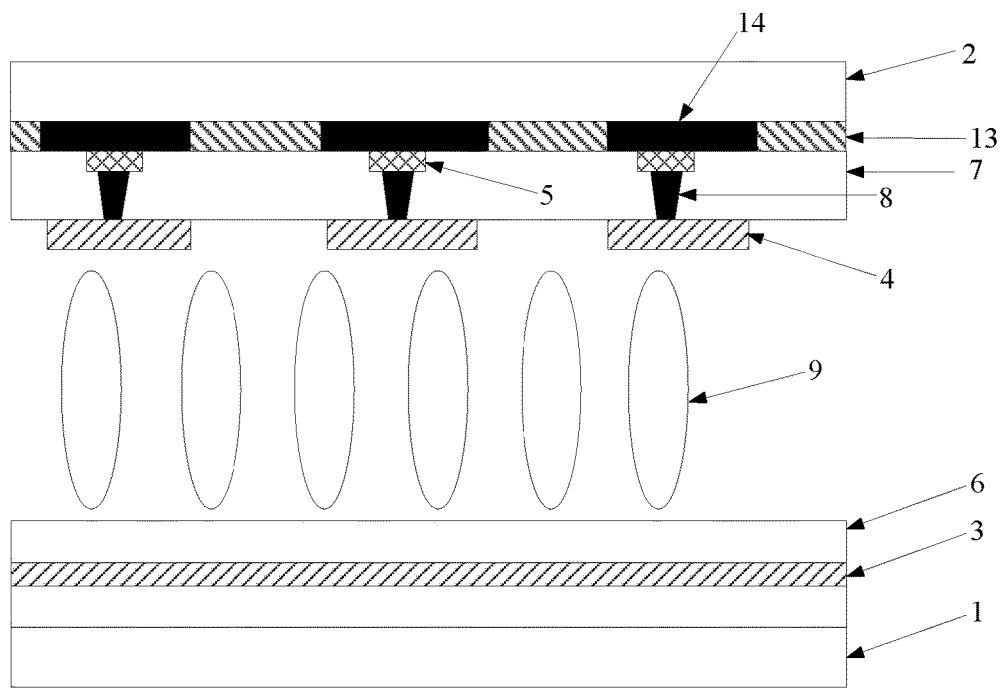
FIG. 14 is a schematic structural diagram of a touch display panel according to an embodiment of the present disclosure.

In another embodiment of the present disclosure, the liquid crystal layer 9 is disposed between the first substrate 1 and the second substrate 2, and the touch electrode layer 4 and the touch electrode wire layer 5 are disposed between the second substrate 2 and the liquid crystal layer 9, as shown in FIG. 13. In the embodiment, the touch electrode layer 4 may be disposed in the same layer with the touch electrode wire layer 5 (as shown in FIG. 13) or in a different layer from the touch electrode wire layer 5 (as shown in FIG. 14), which is not limited herein and depends on actual cases.

Figure 15:
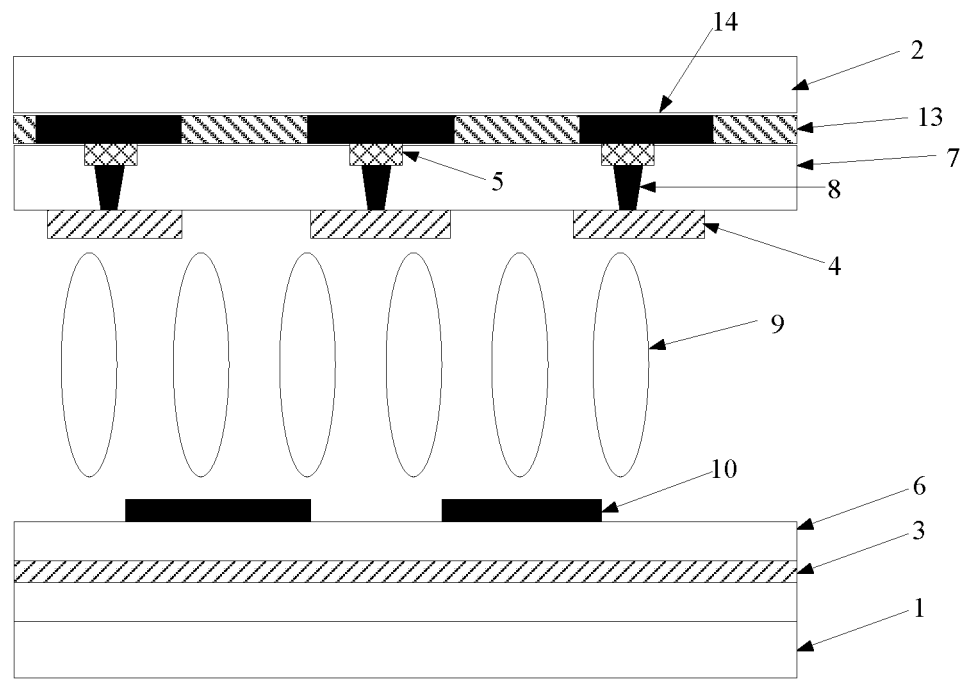
FIG. 15 is a schematic structural diagram of a touch display panel according to an embodiment of the present disclosure.
Figure 16:
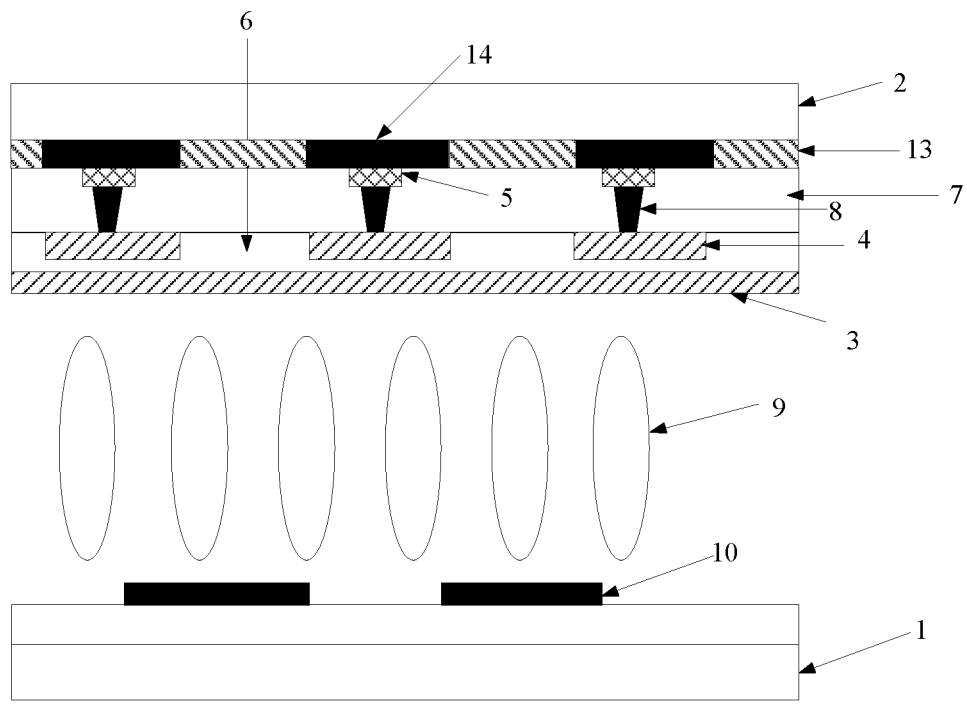
FIG. 16 is a schematic structural diagram of a touch display panel according to an embodiment of the present disclosure.

It should be noted that, in an embodiment of the present disclosure, the touch display panel is an in-plane switching display panel, and the pixel electrode layer 10 is disposed above the common electrode layer 3 as shown in FIG. 15. In another embodiment of the present disclosure, the touch display panel is a twisted-nematic display panel, in which the common electrode layer 3 is disposed between the second substrate 2 and the liquid crystal layer 9 and the pixel electrode layer 10 is disposed between the first substrate 1 and the liquid crystal layer 9, as shown in FIG. 16. In the embodiment, the touch electrode layer 4 may be shielded by the common electrode layer 3, to prevent a touch driving signal in the touch electrode layer 4 from effecting an electric field between the pixel electrode layer 10 and the common electrode layer 3 and then from effecting the rotation of liquid crystal molecules, which is not limited herein and depends on actual cases.

Figure 17:
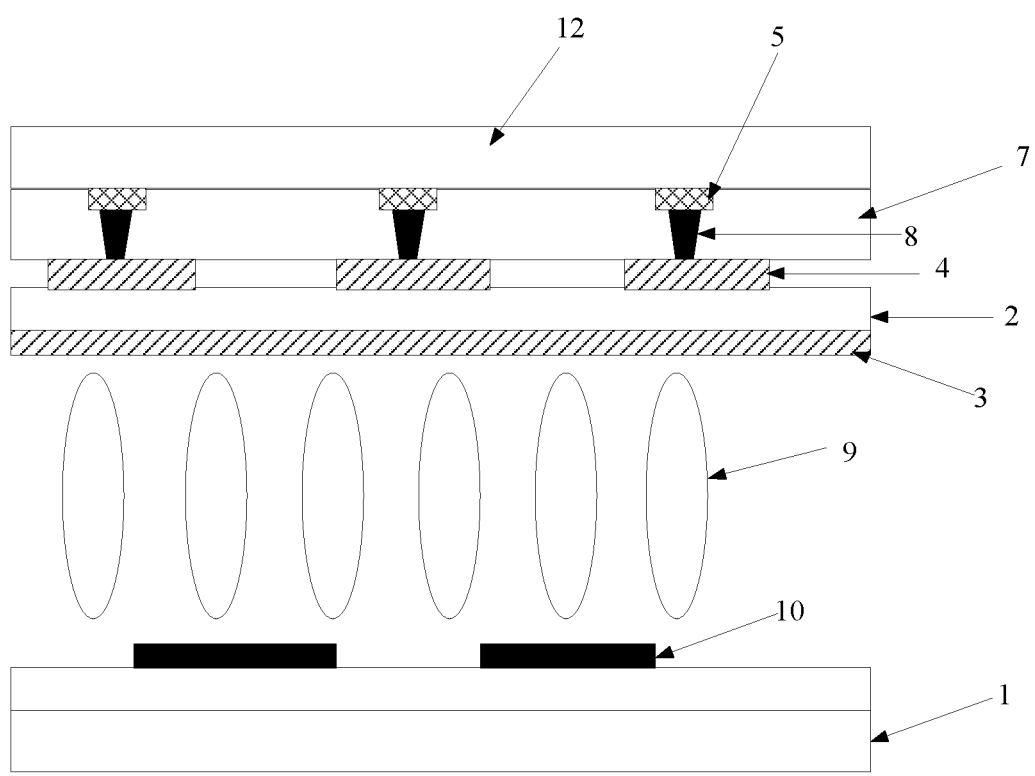
FIG. 17 is a schematic structural diagram of a touch display panel according to an embodiment of the present disclosure.

In another embodiment of the present disclosure, the touch electrode layer 4 and the touch electrode wire layer 5 are disposed above the second substrate 2, as shown in FIG. 17. In the embodiment of the present disclosure, a third substrate 12 is further disposed above the touch electrode wire layer 5, that is, the touch display panel is an out-cell touch display panel.

It should be noted that, in any one of the above embodiments, in the case that the touch electrode layer 4 is disposed in a different layer from the touch electrode wire layer 5, the location of the touch electrode layer 4 in the touch display panel may be exchanged with the location of the touch electrode wire layer 5 in the touch display panel, which is not limited herein and depends on actual cases.

Based on any one of the above embodiments, in an embodiment of the present disclosure, a color film layer 13 and a light shielding layer 14 are disposed above the second substrate 2. In a direction perpendicular to the second substrate 2, a projection of the light shielding layer 14 covers a projection of the touch electrodes completely, thereby improving the light transmittance of the touch display panel. Optionally, in the direction perpendicular to the second substrate 2, the projection of the light shielding layer 14 also covers a projection of the touch electrode wires completely, to further improve the light transmittance of the touch display panel, which is not limited herein and depends on actual cases.

Correspondingly, a display apparatus including the touch display panel according to any one of the above embodiments is provided according to an embodiment of the present disclosure.

In summary, in the touch display panel and the display apparatus according to the embodiments of the present disclosure, the common electrode layer 3 and the touch electrode layer 4 are different layers, and the common electrode layer 3 is an entire piece of electrode. Thus, respective display units may be ensured to have the same common voltage during a display driving, thereby solving the conventional problem of image flicker and non-uniform display of the display panel due to different common voltages in the respective display units caused by different resistances of the block-shaped electrodes in the common electrode layer 3.

Furthermore, in the embodiments of the present disclosure, the touch electrodes in the touch electrode layer 4 are metal grid electrodes. In this case, the resistances of the touch electrodes are reduced and the touch sensitivity of the touch display panel is improved, while the high light transmittance of the touch display panel is ensured.

It should be noted that, positional relationship descriptions, e.g., one layer or element is located above another layer or element, not only include a case that one layer or element is directly formed on another layer or element, but also include a case that other layer(s) may exists between the two layers or elements. The above parts of the specification are described herein in a progressive manner, each part emphasizes differences from other parts, and reference can be made to other parts for understanding same or similar portions between one part and the other parts.

With the above descriptions of the disclosed embodiments, the skilled in the art may achieve or use the present disclosure. Various modifications to the embodiments are apparent for the skilled in the art. The general principle herein can be implemented with other embodiments without departing from the spirit or scope of the disclosure. Therefore, the present disclosure should not be limited to the embodiments disclosed herein, but has the widest scope that is in conformity with the principle and the novel features disclosed herein.

What is claimed is:

1. A touch display panel, comprising:
   a first substrate and a second substrate disposed opposite to each other, wherein the second substrate is above the first substrate;
   a common electrode layer disposed between the first substrate and the second substrate, wherein the common electrode layer is an entire piece of electrode;
   a touch electrode layer disposed above the common electrode layer, wherein the touch electrode layer comprises a plurality of first metal wires arranged in a first direction and a plurality of second metal wires arranged in a second direction,
       wherein the plurality of first metal wires and the plurality of second metal wires crisscross to form a plurality of touch electrodes each in a form of a metal grid; and
       wherein the plurality of touch electrodes is electrically insulated from each other; and
   a touch electrode wire layer disposed above the common electrode layer, wherein the touch electrode wire layer comprises a plurality of touch electrode wires each having a one-to-one electric connection with the metal grid of one of the plurality of touch electrodes.

2. The touch display panel according to claim 1, wherein the touch electrode layer is disposed in the same layer with the touch electrode wire layer.

3. The touch display panel according to claim 2, wherein areas of the respective touch electrodes in the touch electrode layer are reduced gradually along the touch electrode wires.

4. The touch display panel according to claim 1, wherein the touch electrode layer is disposed in a layer different from the touch electrode wire layer, and wherein the one-to-one electric connection between said touch electrode wire and said touch electrodes.

5. The touch display panel according to claim 4, wherein the respective touch electrodes in the touch electrode layer have a same area.

6. The touch display panel according to claim 1, wherein a liquid crystal layer is disposed between the first substrate and the second substrate, and wherein the touch electrode layer and the touch electrode wire layer are disposed between the first substrate and the liquid crystal layer.

7. The touch display panel according to claim 6, wherein a pixel electrode layer is disposed above the common electrode layer.

8. The touch display panel according to claim 7, wherein the pixel electrode layer is disposed in a same layer with the touch electrode layer.

9. The touch display panel according to claim 1, wherein a liquid crystal layer is disposed between the first substrate and the second substrate, and wherein the touch electrode layer and the touch electrode wire layer are disposed between the second substrate and the liquid crystal layer.

10. The touch display panel according to claim 1, wherein the touch electrode layer and the touch electrode wire layer are disposed above the second substrate.

11. The touch display panel according to claim 1, wherein a color film layer and a light shielding layer are disposed above the second substrate in a direction perpendicular to the second substrate, and wherein a projection of the light shielding layer completely covers a projection of the touch electrode.

12. The touch display panel according to claim 11, wherein the projection of the light shielding layer completely covers a projection of the touch electrode wires in the direction perpendicular to the second substrate.

13. A display apparatus, comprising a touch display panel, wherein the touch display panel comprises:
a first substrate and a second substrate disposed opposite to each other, wherein the second substrate is above the first substrate;
a common electrode layer disposed between the first substrate and the second substrate, wherein the common electrode layer is an entire piece of electrode;
a touch electrode layer disposed above the common electrode layer, wherein the touch electrode layer comprises a plurality of first metal wires arranged in a first direction and a plurality of second metal wires arranged in a second direction, and
wherein the plurality of first metal wires and the plurality of second metal wires crisscross to form a plurality of touch electrodes each is in a form of a metal grid; and
wherein the plurality of touch electrodes are electrically insulated from each other; and
a touch electrode wire layer disposed above the common electrode layer, wherein the touch electrode wire layer comprises a plurality of touch electrode wires each having a one-to-one electric connection with the metal grid of one of the plurality of touch electrodes.

14. The display apparatus according to claim 13, wherein the touch electrode layer is disposed in the same layer with the touch electrode wire layer.

15. The display apparatus according to claim 14, wherein areas of the respective touch electrodes in the touch electrode layer are reduced gradually along the touch electrode wires.

16. The display apparatus according to claim 13, wherein the touch electrode layer is disposed in a layer different from the touch electrode wire layer, and wherein the touch electrode wire is electrically connected to the touch electrode through via holes.

17. The display apparatus according to claim 16, wherein the respective touch electrodes in the touch electrode layer have a same area.

18. The display apparatus according to claim 13, wherein a liquid crystal layer is disposed between the first substrate and the second substrate, and wherein the touch electrode layer and the touch electrode wire layer are disposed between the first substrate and the liquid crystal layer.

19. The display apparatus according to claim 18, wherein a pixel electrode layer is disposed above the common electrode layer.

20. The display apparatus according to claim 19, wherein the pixel electrode layer is disposed in a same layer with the touch electrode layer.

* * * * *